Dec. 1, 1964 H. F. WELSH 3,159,793

PHASE MODULATION READING SYSTEM EMPLOYING CONTROLLED GATING FOR INHIBITING SPURIOUS OUTPUTS OCCURRING BETWEEN INFORMATION PULSES

Filed Jan. 23, 1963

INVENTOR
HERBERT F. WELSH

BY Edward M. Farrell

ATTORNEY 3,159,793

PHASE MODULATION READING SYSTEM EMPLOYING CONTROLLED GATING FOR INHIBITING SPURIOUS OUTPUTS OCCURRING BETWEEN INFORMATION PULSES

Herbert F. Welsh, Philadelphia, Pa., assignor to Sperry Rand Corporation, New York, N.Y., a corporation of Delaware Filed Jan. 23, 1963, Ser. No. 253,381
10 Claims. (Cl. 328—99)

This invention relates to a phase modulation system, and more particularly to a phase modulation system for reading binary information from a recording medium.

In many computer systems, binary information signals are recorded on a recording medium, such as a magnetic drum or tape. Such binary signals, having one of two different characteristics, may represent a "1" or a "0" bit of information. A signal representing a "1," for example, may be represented by an alternating signal having a first form for the first half of its digit period and a second form for the second half of its digit period. Likewise, a "0" may be represented by a signal which is in the second form for the first half of its digit period and the first form for the second half of its digit period. Both types of signals may be considered as passing through zero in going from one level to another at the middle of their digit periods.

It is this so called zero crossing point which is utilized in many so called phase modulation systems to produce pulse signals representing a "1" or a "0" during the read out of the information from the record medium. By detecting the direction in which the binary signal is going at the zero crossing point, the nature of the signal, i.e. whether it is a "1" or a "0," may be determined.

One of the chief advantages which may be derived from a phase modulation system which uses zero crossover points to determine the nature of the information signals is that recorded sprocket or clock signals are not necessary to recover the information signals. So called "self-sprocketing" systems are therefore feasible in such phase modulation systems. These are systems in which the information signals themselves are used to generate the sprocket signals, which may also be referred to as timing signals.

In a phase modulation system of the type mentioned, the original signals which are recorded on the recording medium generally pass through various stages during the reading operation to convert the recorded information into pulses representing "1's" and "0's." In passing through these various stages, so called "non-significant" or spurious pulse signals are produced. Non-significant pulse signals are produced whenever the pattern of signals include two consecutive similar information signals, for example, either two consecutive "0's" or two consecutive "1's." Under these conditions, the information signals pass through zero at points of time other than the middle of the digit periods, in additional to passing through zero at the middle of the digit periods. These points of time are generally the beginning of the digit periods.

Since only the zero crossover points at the middle of the digit periods are used to recover true information signals, other generated signals or pulses which have the same characteristic as information signals are considered non-significant or spurious signals and must be eliminated before the information signals are applied to subsequent circuits.

While some so called self-sprocketing systems have been used in the past, many such systems have proven to be unsatisfactory when the speed of the recording medium during a reading operation varies to thereby cause the time intervals of the information signals to vary. The disadvantages arising from a variable speed of a recording medium, while often not too serious in the case of a drum storage device rotating at a relatively constant speed, do become serious problems in reading operations involving a tape where large speed variations are generally present.

It is an object of this invention to provide an improved read out circuit in a magnetic recording system.

It is a further object of this invention to provide an improved read out circuit for eliminating non-significant pulse signals from a series of information pulse signals when variable speeds of the recording medium are involved.

In accordance with the present invention, a circuit for reading binary information signals from a magnetic recording medium is provided. The information signals are converted into a pulse train of signals which include pulse signals representative of the binary information signals as well as non-significant pulse signals. The information pulse signals are used to trigger a circuit which produces an inhibit signal too prevent the non-significant pulse signals from passing to subsequent utilization circuits. The information pulse signals are applied to a resonant circuit to produce a sine wave signal. The sine wave signal is used to produce termination pulses which are applied to the circuit to terminate the inhibit signal thereby permitting passage of the information signals to subsequent utilization circuits.

Other objects and advantages of the present invention will be apparent and suggest themselves to those skilled in the art, from a reading of the following specification and claims in conjunction with the accompanying drawing, in which:

Figures 1, 2, 3:
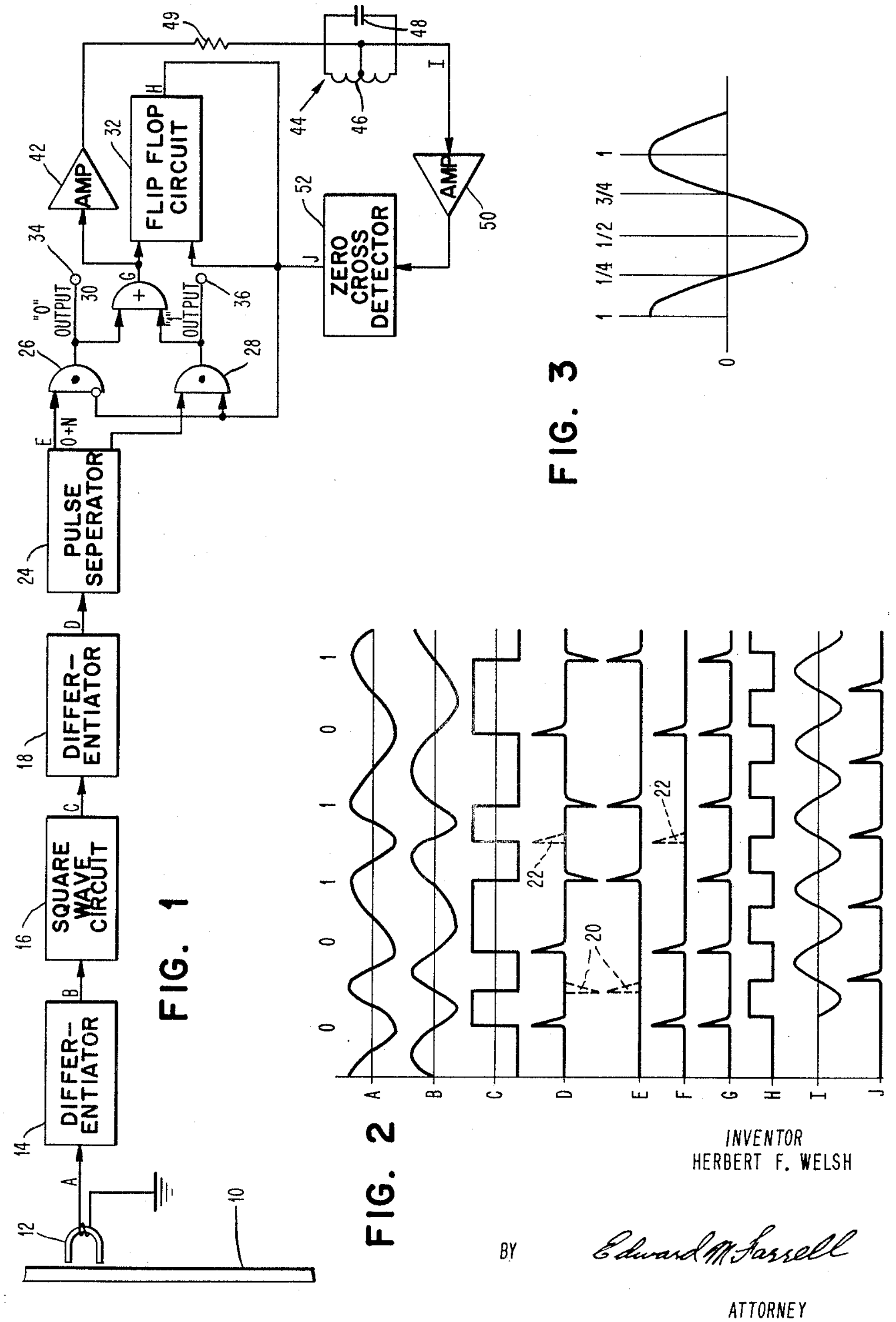
FIGURE 1 is a schematic diagram, partly in block diagram form, of one form of the present invention.
FIGURE 2 is a series of waveforms shown for the purpose of describing the invention illustrated in FIGURE 1.
FIGURE 3 illustrates a sine wave signal shown for purposes of explanation of the invention of FIGURE 1.

Referring to FIGURES 1 and 2, binary information signals to be read may be recorded on a recording medium 10. This recording medium, for example, may be a magnetic tape. The information from the recording medium 10 produces an electrical signal in a reading head 12. The signal read out by the reading head 12 is illustrated in FIGURE 2 by a waveform A. In the example illustrated, the information comprises a series of information bits 001101.

The output signals from the reading head 12 are applied to a form of differentiator circuit 14 which produces signals illustrated by the waveform B. The signals of waveform B are delayed by approximately 90 degrees. The differentiator circuit 14 delays the signals represented by the waveform A so that the zero crossover points coincide with the peaks of the signals represented by the waveform A. Signal delay circuits are well known to those skilled in the art and therefore are not described or shown in detail.

The output signals from the differentiator circuit 14 are applied to a square wave generator circuit 16 which produces output signals corresponding to the waveform C. The square generator circuit 16 may be a form of Schmitt trigger circuit or other such conventional circuit for converting sine wave signals into square wave signals.

The output signal from the square wave generator circuit 16 is applied to a second differentiator circuit 18 to produce pulse signals represented by the waveform D. This differentiator circuit may comprise a conventional resistor-capacitor type network which produces pulse signals for each change in direction of applied square wave signals.

The waveform C may correspond in polarity to the signal waveform originally recorded. A "0," in the embodiment illustrated, may be represented by a signal generated when the direction of the signal of waveform C is moving in the positive direction at the zero cross over point. Likewise a "1" may be represented by a signal generated when the change in direction of the signal of waveform C is moving in the negative direction at the zero cross over point.

When two consecutive information signals have the same characteristic, i.e., both consecutive signals represent either a "0" or a "1" type of information signal, pulse signals are produced intermediate the information pulse signals which do not actually represent true information. These signals may be considered spurious or non-significant pulses. These spurious pulse signals are represented by pulses 20 and 22, illustrated in FIGURE 2 by dotted lines in the waveform D.

The output signal from differentiator circuit 18, represented by the waveform D, is applied to a pulse separator circuit 24 to produce a series of signals represented in FIGURE 2 by the waveforms E and F. The pulse separator circuit 24 separates the pulse signals of one polarity from pulse signals of the opposite polarity. Such a circuit may include, for example, a diode arrangement or various other types of circuits. Such circuits are well known to those skilled in the art and consequently are not shown or described in detail.

The signal waveform E includes the non-significant pulse signal 20 as well as the pulse signals representing "0's." Likewise, the waveform F includes the non-significant pulse signal 22 as well as the pulse signals representing "1's." Since the non-significant pulses 20 and 22 do not represent true information, they must be suppressed or eliminated before passing the information pulse signals to subsequent utilization circuits in a computer, for example.

The output signals from the pulse separator circuit 24 are applied to a pair of gate circuits 26 and 28. The gate circuit 26 receives the signals represented by waveform E, which include the "0" bits of information pulses, as well as the non-significant pulse signal 20. The gate circuit 28 receives the pulse signals represented by waveform F, which includes the "1" bits of information pulses, as well as the non-significant pulse signal 22, which has the same characteristic as the "1" information bit.

The output signals from the gate circuits 26 and 28 are applied to an OR gate circuit 30, which acts as a buffer stage for the information pulse signals. All the information signals illustrated by the waveforms E and F are combined to produce a series of signals represented by the waveform G. It is noted that waveform G does not include the non-significant pulse signals 20 and 22. The means for eliminating these non-significant or spurious signals, which is one of the main features of the present invention, will now be described.

The output signal from the OR gate 30, represented by the waveform G, is applied to set a delay flop circuit 32. The delay flop circuit 32 produces at its output line 33 an output signal corresponding to the waveform H. In the embodiment illustrated, the signal at the line 33 is variable in duration with its duration being determined by the time between set and reset signals which are applied to the flip-flop circuit 32. The set signals are the pulse signals from the OR gate circuit 30 and the reset signals are a source of termination signals, to be described. In order to provide the means for eliminating spurious pulse signals, the duration of the signal from the flip-flop 32 should be in the order of three quarters of a digit period and generally be greater than one-half and less than a full digit period. The output signal at point H provides an inhibit signal for the gate circuits 26 and 28. The signals of waveform H are illustrated as being of a positive polarity during its set time although it is apparent that the polarities of these signals as well as all the waveforms shown are merely illustrative.

During the time that the signals at point H are positive, any pulse signals applied to the gate circuits 26 or 28 from the pulse separator circuit 24 are inhibited or prevented from passing therethrough. When the time relationships of the signals from the pulse separator circuit 24, illustrated by the waveforms E and F, are compared with the signals of waveform H, it may be seen that the information signals which are used to trigger the delay flop 32 are permitted to pass through the gate circuits 26 and 28, since these information signals appear slightly before the time of the positive inhibit portions of the signals of waveform H.

The above described operation is based on the assumption that proper synchronizing signals have been applied to start the proper operation of the system illustrated. Such synchronizing signals are normally provided in a computer system by the application to the flip-flop circuit of a series of "start up" signals which have no non-significant pulse signals.

Information pulses, representing "0's" are applied from the gate circuit 26 to an output terminal 34. Likewise, information pulses representing "1's" are applied from the gate circuit 28 to an output terminal 36. The output terminals 34 and 36 may be connected to various utilization circuits within a computer system where information is to be used.

In situations where the digit period is maintained constant, the system thus far described, which may include a delay flop which produces an inhibit signal of a fixed three quarter duration of a digit period, is often adequate. However, when the digit time period varies over a wide range a delay flop circuit which produces an inhibit signal of a fixed duration is inadequate and, in many cases, will produce errors in the system.

For example, if the recording medium slows down, the time between information pulses increases. If a predetermined fixed three quarter inhibit signal is used, based on the assumption that the recording medium will always be moving at some fixed constant speed, non-significant pulse signals may appear outside of the three quarter period and will be treated as true information.

Likewise, a speeding up on the recording medium cause the time between information pulses to be reduced. A fixed three-quarter inhibit signal will then tend to suppress the information pulses which fall within the three quarter digit period.

One example which involves widely varying digit periods may, for example, be a magnetic tape recording system when such tapes are being brought to full speed from a still position, or vice versa.

In order to overcome some of the disadvantages of a fixed delay flop circuit in systems involving a variable speed recording medium, the present invention provides means for varying duration of the inhibit signals from the delay flop circuit 32, in accordance with an average rate of the information signals.

As was pointed out, the pulse signals from the OR gate 30 are applied to set the flip-flop 32. The pulse signals from the OR gate circuit 30 are also applied through an amplifier 42 a resistor 49 and to a tuned or resonant circuit 44. The tuned or resonant circuit 44 may include a center tapped coil 46 and a capacitor 48. When the circuit 44 is triggered by input pulses from the amplifier 42, it tends to oscillate at a frequency substantially the same as the frequency of the input signal. Thus, a series of pulse signals illustrated by waveform G will tend to generate a sine wave signal, represented by waveform I.

The output signals from the tuned circuit 44 are applied through an amplifier 50 to a zero cross detector circuit 52. Whenever the input signals through the zero cross detector circuit 52 are moving in positive directions at the zero reference points, pulse signals, represented by wave form J, are generated.

The pulse signals from the zero cross detector 52 are applied to reset the flip-flop circuit 32, i.e., return it from its high positive voltage level to its original low level. Thus it is seen that the pulse signals of waveform G are applied to set the flip-flop circuit 32 and the pulse signals, represented by the waveform J, are applied to reset the flip-flop circuit 32.

The zero cross detector 52 may be a Schmitt trigger or other similar type circuit capable of producing pulse signals whenever an applied signal crosses a zero reference point. Any pulses resulting from negative going zero crossings may be eliminated through the use of diodes or other means well known to those skilled in the art.

Referring to FIGURE 3, which is an enlarged portion of waveform I, it is noted that the waveform crosses the zero line in positive directions three quarter of a cycle after the peaks of the sine wave signals. In considering FIGURE 3, assume that the peaks of the signal represent the time of the wanted zero crossing, i.e., the time of the information pulse signals. If this is so, then the unwanted zero crossing will occur one-half a digit period latter, since such unwanted zero crossings generally occur in the middle of information pulses and substantially one-half of a digit period after the information pulses.

When a wanted crossing occurs at the peak period, the so called inhibit means or mechanism, illustrated in one embodiment as being the flip-flop circuit 32, is set or turned on by the production of a positive signal, as in waveform H. The flip-flop 32 is not turned off or reset again until a reset signal is applied. Resetting of the flip-flop 32 causes a low or negative signal at its output as illustrated by waveform H. A reset signal is produced when ever the sine wave signal of waveform I crosses the zero line in a positive going direction. The time of this occurrence is substantially three-quarters of a time period from the peak of the sine wave signal. This operation results in the flip-flop 32 or other detection mechanism producing an inhibit signal having a duration of three quarter time period. The time periods of the inhibit signals produced are dependent upon the cycle time of the signal produced by the tuned circuit 44.

The tuned circuit 44 may be one of moderate "Q," since, during operation, it is desired to have a single mis-aligned pulse affecting the cycle period by only a small amount. If a high "Q" selected, the tuned circuit will average too many pulses. A low "Q" tuned circuit will be drastically affected by the last pulse and, therefore, too sensitive.

A tuned circuit is used to reset the flip-flop circuit 32 because a tuned circuit will average the previous pulses. A delay flop will be directly affected by a misaligned starting pulse and, as noted perviously, could be at the "turning on" or "set" stage at the time that a subsequent information pulse is applied to the system. With a tuned circuit providing the reset signals for the flip-flop circuit 32, the subsequent information pulses will still be permitted to pass through the gate circuit 30.

With the tuned circuit providing the reset pulses, a very late pulse will have little effect on the cycle time of the tuned circuit and the three-quarter cycle time will occur very nearly at its normal time. Thus, there will remain almost a full one quarter time period from the positive going crossing of the sine wave signal until the next signal peak. In like manner, an early pulse will have little effect on the time at which three quarter or positive crossing point will occur.

Returning again to FIGURE 1, it is seen that the "1's" and non-significant "1" crossings from the pulse separator circuit 24 pass to the gate circuit 28. The "0's" and non-significant "0" crossings from the pulse separator circuit 24 are applied to the gate circuit 26. The output signals from the gate circuits 26 and 28 are applied to a buffer or "OR" gate circuit 30. The pulse signals from the "OR" gate 30 are applied to both the flip-flop circuit 32 and to the tuned circuit 44. The output pulses from the "OR" gate 30 sets the flip-flop 32, which in turn closes the gate circuits 26 and 28. In addition, the output signals from the "OR" circuits 30 introduces any frequency change, if any, into the tuned circuit 44. The output signal from the tuned circuit 44 is fed to the zero cross detector 52 which detects positive going crossings. When such crossings occur, the zero cross detector 52 produces a pulse which is applied to reset the flip-flop 32. The output signal from the flip-flop 32 opens the gates 26 and 28 to permit the next wanted "1" or "0" information pulse to pass therethrough.

It is noted that the present invention is directed to features and operations which occur in connection with and subsequent to the gates circuits 26 and 28. Various other circuits, such as differentiators, square wave circuits, and pulse separators have been illustrated by blocks in order to illustrate a complete system involving a reading operation. It is apparent, however, that the present invention may be used in connection with any system where non-significant pulses are developed and must be suppressed.

While the writing operation has been described in general terms in the introduction for purposes of clarity, it is recognized that the present invention is not particularly related to any one type of writing system.

The present invention may be used in conjunction with any writing system where a subsequent reading operation produces non-significant pulses. The present invention is particularly applicable to tape recording reading systems in which the tape may operate at variable speeds, especially when the system is being started.

The embodiments of the invention in which an exclusive property or privilege is claimed are defined as follows:

1. A read out circuit comprising a source of pulse signals, a control signal source, means for applying said pulse signals to said control signal source to generate control signals, a tuned circuit, means for applying said pulse signals to said tuned circuit to produce substantial sine wave signals, means for utilizing said sine wave signals to produce second pulse signals, and means for applying said second pulse signals to said control source to terminate said control signals.

2. A read out circuit comprising a source of pulse signals representing information, a control signal source, means for applying said pulse signals to said control signal source to generate control signals, a tuned circuit adapted to be triggered by pulse signals to produce substantially sine wave signals, means for applying said pulse signals to said tuned circuit to produce said sine wave signals, a detector circuit, means for applying said sine wave signals to said detector circuit to produce second pulse signals, and means for applying said second pulse signals to said control signal source to terminate said control signals.

3. A read out circuit for reading out binary information signals from a recording medium comprising means for converting said information signals into pulse signals, an inhibit signal producing source, means for applying said pulse signals to said signal source to start the generation of said inhibit signals, a tuned circuit, means for applying said pulse signals to said tuned circuit to produce sine wave signals, means for utilizing said sine wave signals to produce second pulse signals, and means for applying said second pulse signals to said inhibit signal producing source to terminate said inhibit signals.

4. A circuit for reading binary information signals from a magnetic recording medium comprising means for converting said binary signals into a series of pulse signals including pulse signals representative of said binary information signals and spurious pulse signals, a gating circuit, means for applying said series of pulse signals to said gating circuit, a control circuit for producing inhibit signals, means for applying said binary information pulse signals from said gating circuit to trigger said control circuit to produce said inhibit signals, means for applying said inhibit signals from said control circuit to said gating circuit to inhibit said spurious pulse signals from passing through said gating circuit, means for generating termination pulse signals, and means for applying said termination pulse signals to said control circuit to terminate said inhibit signals to permit said information pulse signals to pass through said gating circuit.

5. A circuit for reading binary information signals from a magnetic recording medium comprising means for converting said binary signals into pulse signals including pulse signals representing said binary information signals and non-significant pulse signals, a gating circuit, means for applying said pulse signals to said gating circuit, a flip-flop circuit for producing inhibit signals, means for applying said binary information signals from said gating circuit to trigger said flip-flop circuit to commence the production of said inhibit signals, means for applying said inhibit signals to said gating circuit to inhibit said non-significant pulse signals from passing through said gating circuit, and means for applying a signal to said flip-flop circuit to terminate said inhibit signals to permit information pulse signals to pass through said gating circuit.

6. A circuit for reading binary information signals from a magnetic recording medium comprising means for converting said binary signals into pulse signals including pulse signals representative of said binary information signals and non-significant pulse signals, a gating circuit, means for applying said pulse signals to said gating circuit, a flip-flop circuit, means for applying said binary information signals from said gating circuit to trigger said flip-flop circuit to commence the production of said inhibit signals, and means for applying said inhibit signal from said flip-flop circuit to said gating circuit to inhibit said non-significant pulse signals from passing through said gating circuit, a tuned circuit adapted to be triggered by pulse signals to produce substantial sine wave signals, means for utilizing said sine wave signals to produce a second group of pulse signals, and means for applying said second group of pulse signals to said flip-flop circuit to terminate said inhibit signals to permit information signals to pass through said gating circuit.

7. A circuit for reading binary information signals from a magnetic recording medium comprising means for converting said binary signals into pulse signals including pulse signals representative of said binary information signals and non-significant pulse signals, a gate circuit, means for applying said pulse signals to said gate circuit, a flip-flop circuit adapted to be set and reset by the application of pulse signals thereto, means for applying said pulse signals from said gating circuit to set said flip-flop circuit to produce an inhibit signal, means for applying said inhibit signal to said gating circuit to inhibit said non-significant pulse signals from passing through said gating circuit, a tuned circuit for generating termination pulse signals, means for applying said pulse signals to said tuned circuit to produce said termination pulse signals, and means for applying said pulse termination signal to reset said flip-flop circuit to terminate said inhibit signal and permit said pulse signals representative of said binary information signal to pass through said gate circuit.

8. The invention as set forth in claim 7 wherein said termination pulse signals are generated approximately three-quarters of a digit period after said pulse signals representative of said binary information signals.

9. A circuit for reading binary information signals from a magnetic recording medium comprising means for converting said binary signals into pulse signals including first pulse signals representative of said binary information signals and non-significant pulse signals, a gate circuit, means for applying said pulse signals to said gate circuit, a flip-flop circuit adapted to be set and reset by the application of pulse signals thereto, means for applying said pulse signals from said gating circuit to set said flip-flop circuit to produce an inhibit signal, means for applying said inhibit signal to said gating circuit to inhibit said non-significant pulse signals from passing through said gating circuit, a tuned circuit for generating substantially sine wave signals, a detector circuit for producing second pulse signals, means for applying said first pulse signals to said tuned circuit to produce said sine wave signals, means for applying said sine wave signals to said detector circuit to produce said second pulse signals, and means for applying said second pulse signals to reset said flip-flop circuit to terminate said inhibit signal to permit said pulse signals representative of said binary information signals to pass therethrough.

10. The invention as set forth in claim 9 wherein said second pulse signals are produced substantially three quarters of a digit period after said first pulse signals.

References Cited in the file of this patent

UNITED STATES PATENTS

| | | |
|---|---|---|
| 2,760,087 | Felker | Aug. 21, 1956 |
| 2,911,623 | Rosenheim | Nov. 3, 1959 |
| 3,050,639 | Tate | Aug. 21, 1962 |
| 3,097,340 | Dobbie | July 9, 1963 |